United States Patent [19]
Jiang

[11] Patent Number: 6,084,964
[45] Date of Patent: Jul. 4, 2000

[54] MECHANICAL AUTOMATIC PUSHBUTTON DIALING DEVICE FOR TELEPHONES

[75] Inventor: Jung-Jye Jiang, P.O. Box 82-144, Taipei, Taiwan

[73] Assignees: Jung-Jye Jiang; Hanaqua Tech Inc., both of Taipei, Taiwan

[21] Appl. No.: 09/110,193

[22] Filed: Jul. 6, 1998

[51] Int. Cl.$^7$ ................................................. H04M 1/00
[52] U.S. Cl. .......................................................... 379/456
[58] Field of Search ................................. 379/456, 447, 379/448, 450

[56] References Cited

U.S. PATENT DOCUMENTS

| | | | |
|---|---|---|---|
| 3,360,612 | 12/1967 | Klumb | 379/456 |
| 3,454,725 | 7/1969 | D'Acunto | 379/456 |

*Primary Examiner*—Jack Chiang
*Attorney, Agent, or Firm*—A & J

[57] ABSTRACT

A mechanical automatic pushbutton dialing device for telephones includes a roller and a planar plate having a plurality of holes. The roller is capable of rolling along the planar plate in a linear direction and selectively entering one of said holes of the planar plate by means of the arrangement of a motor, springs, and a roller guiding mechanism. The downward force generated at the instant when the roller falls into the hole is utilized to achieve automatic pushbutton dialing. The numerals to be dialed and the number of times of dialing may be freely determined by means of a motor controller. The device utilizes movable clamps to adjust the pushbutton dialing positions so as to match the size of the telephone set and the shape of the pushbuttons. Hence, the device may match different telephone models.

1 Claim, 4 Drawing Sheets

MECHANICAL AUTOMATIC PUSHBUTTON DIALING DEVICE FOR TELEPHONES

BACKGROUND OF THE INVENTION

1. Field of the Invention

The present invention relates generally to a mechanical automatic pushbutton dialing device for telephones, and more particularly to a mechanical automatic pushbutton dialing device adapted to be used with different models of telephone sets.

2. Description of the Prior Art

Built-in electronic automatic dialing devices of conventional telephones may vary according to different models. The degree of difficulty increases when the telephone is used in conjunction with other production machinery. To illustrate, when there is trouble with a product machine that is fully automatic in normal circumstances and the responsible person has to get to the site within a certain period of time, the automatic dialing device of a telephone may be actuated to inform the responsible person via his/her pager. This is an example in which the telephone is used in cooperation with a production machine.

SUMMARY OF THE INVENTION

The present invention relates generally to a mechanical automatic pushbutton dialing device for telephones, and more particularly to a mechanical automatic pushbutton dialing device adapted to be used with different models of telephone sets.

A primary object of the present invention is to provide a mechanical automatic pushbutton dialing device for telephones, which is adapted to be easily connectable with any model of telephones so as to solve the problem of connection due to different models of telephones.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
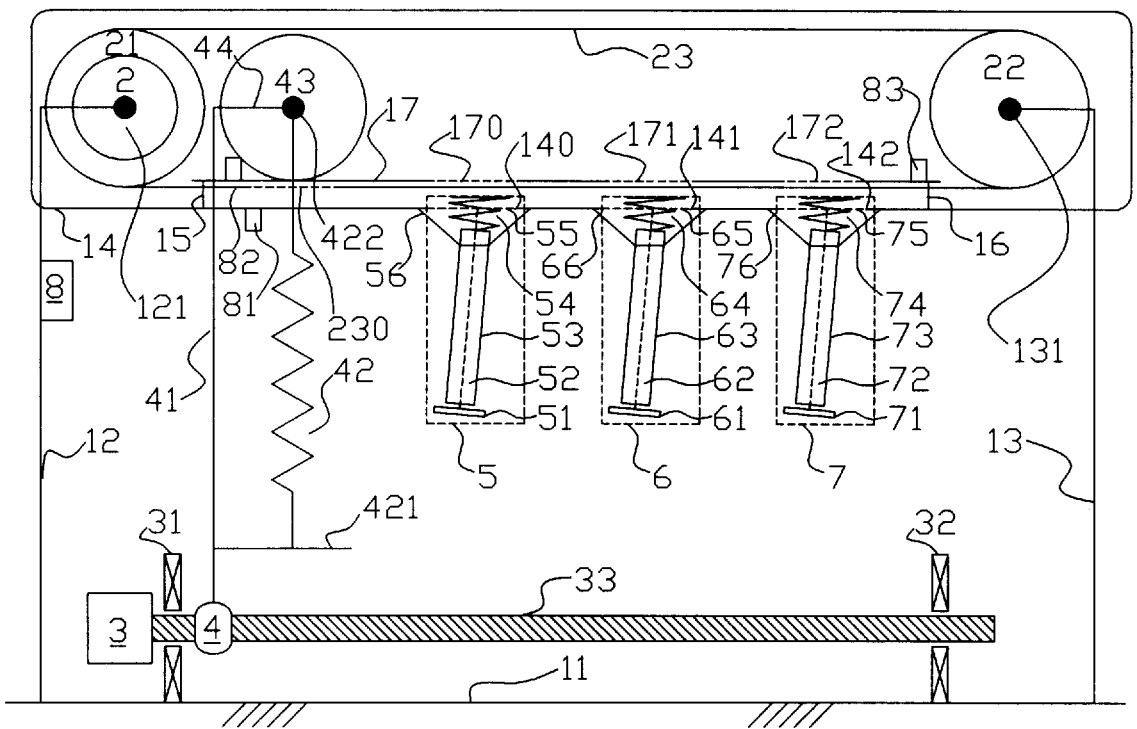
FIG. 1 is a schematic plan view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

The present invention is directed to a mechanical automatic pushbutton dialing device for telephones, which employs a single roller to roll along a planar plate with multiple holes and selectively roll into one of the holes by means of the combination of a motor, a spring, and a roller guiding mechanism. The instant dropping of the roller into the selected hole generates a downward action to achieve the function of automatic pushbutton dialing. The device of the present invention utilizes movable clamps which allow adjustment of the pushbutton dialing positions depending on the shape and positions of the telephone and the pushbuttons, thereby achieving a device adapted to suit different telephone models. The present invention will be described in detail hereinafter.

Figure 2:
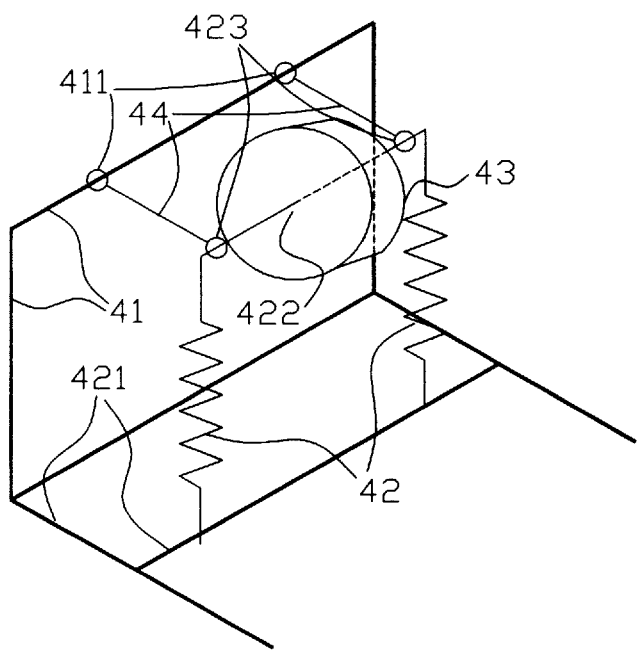
FIG. 2 is a schematic perspective view of a roller spring frame of the present invention.

A motor controller 8 controls the angle of rotation of a motor 3 (see FIG. 1) to drive a guide screw rod 33 and move a guide base 4 having inner threads, thereby driving a roller guide frame 41 as a whole (see FIG. 2). At this point, a roller 43 will follow the back and forth movement of the roller guide frame 41 to roll back and forth in a linear direction along a roll plate 17 having a plurality of rectangular holes 170, 171, and 172 and will selectively enter one of the holes of the roll plate 17. The inner and outer limits within which the roller guide frame 41 moves are controlled by inner and outer limit switches 82 and 83.

Regarding the principle of hole entering (see FIGS. 2 and 3), the two ends of springs 42 are secured on a spring mounting frame 421 and a bearing set 422. Links 44 and pivots 411 and 423 are used to connect the roller guide frame 41 and the bearing set 422 so that when a roller 43 and the bearing set 422 are subjected to a vertical force, they may move up and down to a little extent along a curve with the pivots 411 and 423 as centers to mount the roller 43 on the roll plate 17 such that the springs 42 are in a taut state. At this point, the roller 43 is constantly subjected to a downwardly pulling vertical action so that it may roll along the roll plate 17. When the roller 43 rolls along the rolling the roll plate 17 in a linear direction and encounters one of the rectangular holes 170, 171, 172, it will instantly fall into it.

Figure 3:
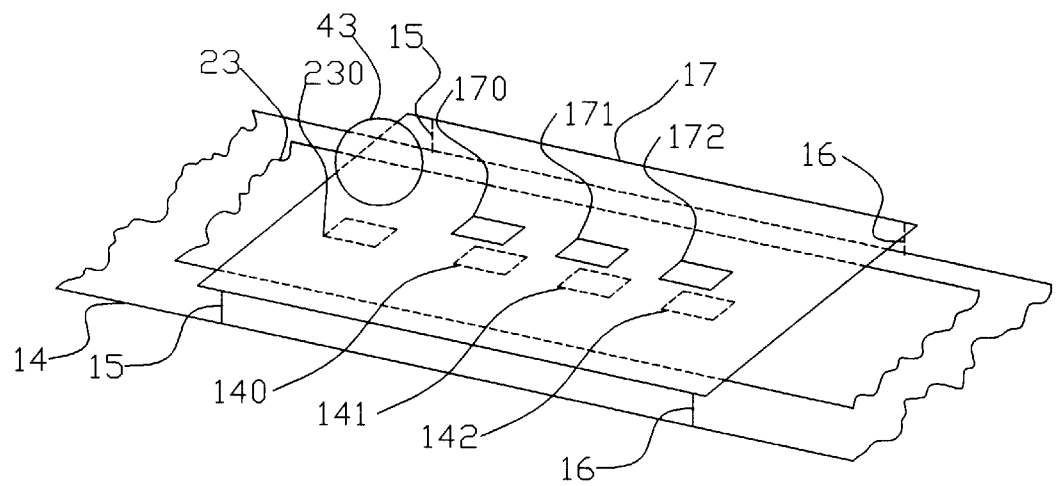
FIG. 3 is a schematic perspective view illustrating the relationship among the roller, roll plate, belt and bottom plate of the mechanism protective box of the present invention.
Figure 4:
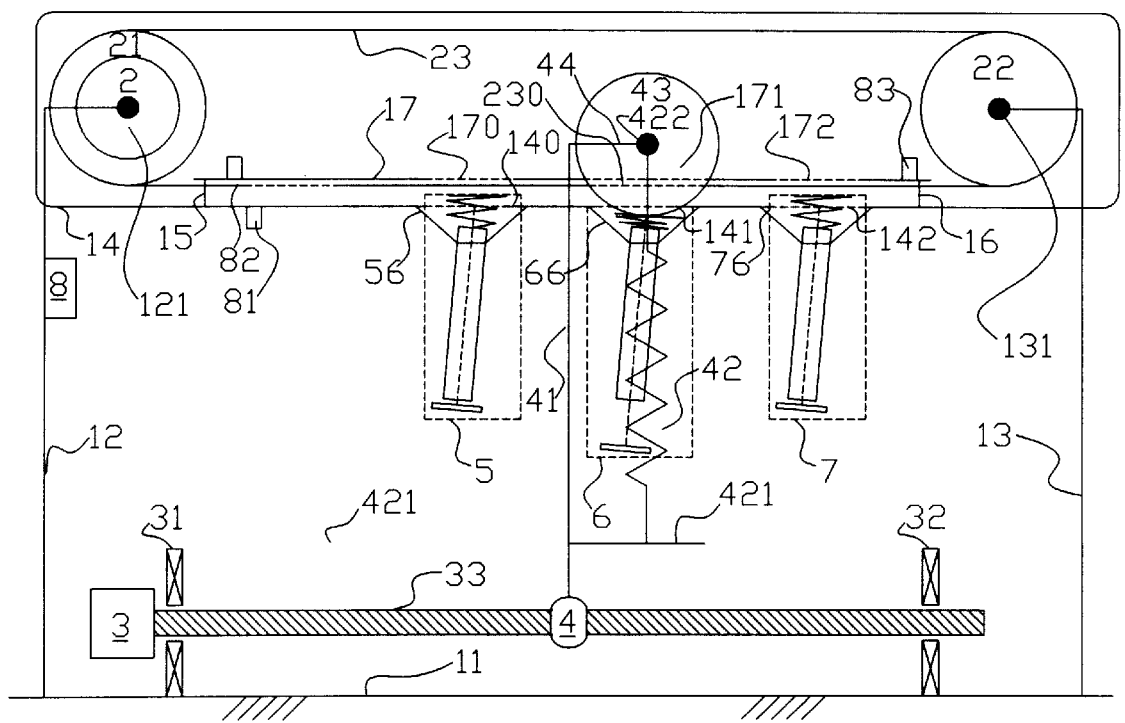
FIG. 4 is a schematic view illustrating operation of the selective hole entering of the roller according to the present invention.
Figures 5A, 5B:
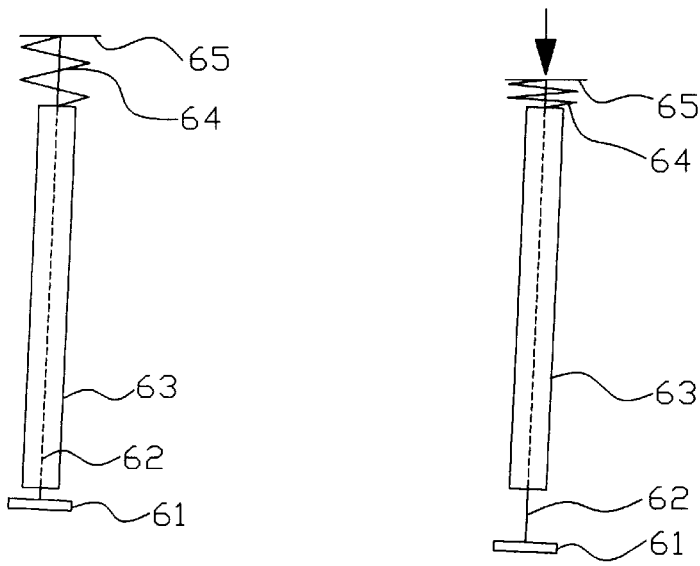
FIG. 5(a) is a schematic view illustrating a force transmitting device prior to its subjection to force.
FIG. 5(b) is a schematic view illustrating a force transmitting device prior to and after subjection to force.

The roll plate 17 is secured and supported by small supports 15, 16 on a bottom plate of a mechanism protective box 14. With regard to the principle of hole entering, the motor controller 8 is used to control the motor 2 to rotate pulleys 21, 22 so that a belt 23 with a single rectangular hole 230 moves to a determined position. The belt 23 is pulled taut by the pulleys 21, 22 and located intermediate the roll plate 17 and the bottom plate of the protective box 14. The bottom plate of the protective box 14 has rectangular holes 140, 141, 142 corresponding to the rectangular holes 170, 171, 172 of the roll plate 17 (as shown in FIG. 3). If the roller 43 selects to enter the hole 171 of the roll plate 17 (see FIG. 4), the belt 23 will move the position of its rectangular hole 230 to that of the rectangular hole 141 of the protective box 14, the three holes thus forming a straight line. When the roller 43 rolls along the roll plate 17 in a linear direction past the rectangular hole 170, since the belt 23 is not provided with any hole there, the roller 43 will not enter any hole. Instead, it rolls on to the rectangular hole 171. Since the belt 23 is provided with a hole there, the roller 43 will naturally fall into the hole of the belt 23 and pass the hole 141 of the protective box 14. Since the rectangular holes at the bottom plate of the protective box 14 have force transmitting devices 5, 6, 7 inserted therein (see FIG. 1), which are secured below the bottom plate of the protective box 14 by securing frames 56, 66, 76, when the roller 43 drops into a hole of the roll plate 17, it may press against a rubber piece 65 and a compression spring 64 at the upper end of the force transmitting device (as shown in FIGS. 4, 5A and 5B) so that a steel wire 62 displaces downwardly and passes over a wire sleeve 63 to transmit the thrust to a force bearing pad 61, thus achieving the function of pushbutton dialing. Subsequently, the motor controller 8 emits a signal to move the rectangular hole 230 to the position of a reflecting sensor 81, i.e., the original position of the belt 23 to which the belt 23 resets.

Figure 6:
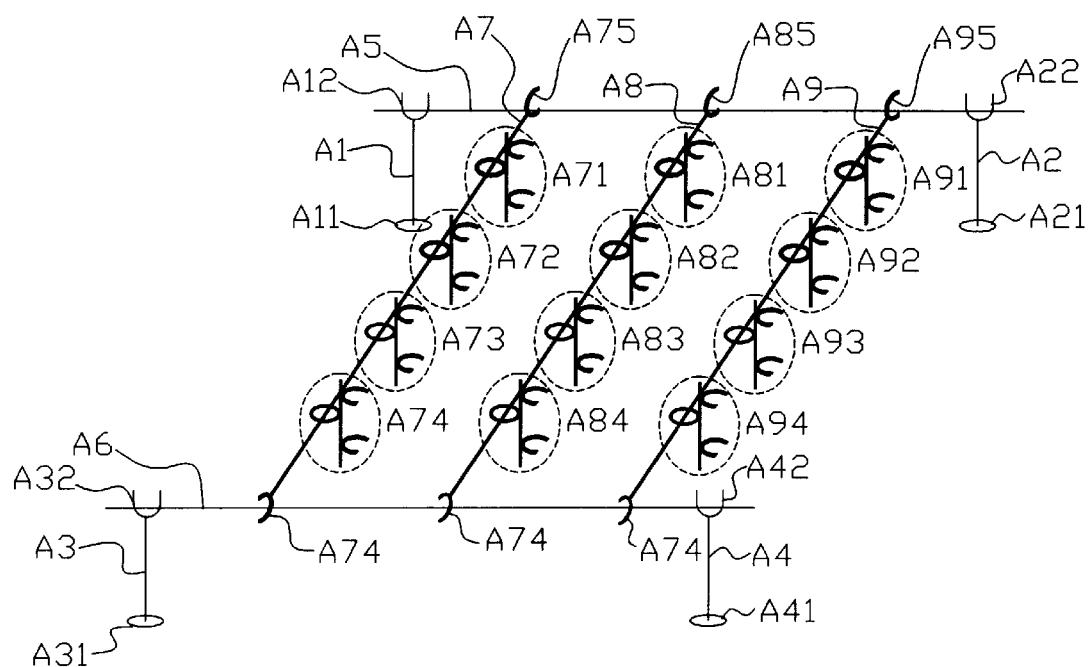
FIG. 6 is a schematic perspective view of a clamp frame of the force transmitting device of the present invention.

As for the numerals for dialing purposes, the three force transmitting devices shown in FIG. 1 may be increased to twelve each having a designated numeral to stand for the pushbuttons of 1, 2, 3, 4, 5, 6, 7, 8, 9,\*, 0, and # on the telephone. The force transmitting device is coupled to a clamp frame (as shown in FIG. 6). According to the structure of this device, bases A11, A21, A31, A41 are utilized to support vertical frames A1, A2, A3, A4. Four clamps A12, A22, A32, A42 are secured at the top ends of the vertical frames respectively. Clamps A12, A22, and A32, A42 in two pairs respectively clamp horizontal frames A5, A6. The two ends of the three longitudinal frames A7, A8, A9 are respectively mounted in sequence with clamping units A75, A76; A85, A86; and A95, A96 to clamp the horizontal frames A5, A6. The longitudinal frames A7, A8, A9 respectively have clamping elements A71, A72, A73, A74; A81, A82, A83, A84; and A91, A92, A93, A94 attached thereto. The positions of all the supports, clamps, and clamping elements on the force transmitting clamping frame may be adjusted according to the size and positions of the pushbuttons.

Figure 7:
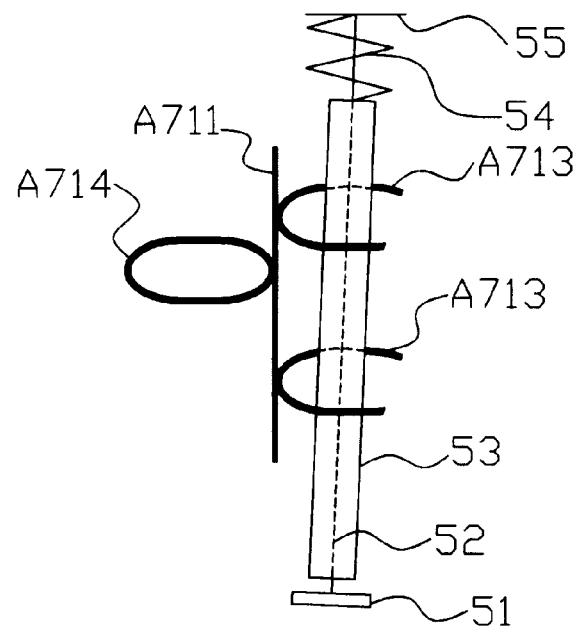
FIG. 7 is a schematic assembled view showing a single clamping element holding a force transmitting device.
Figure 8:
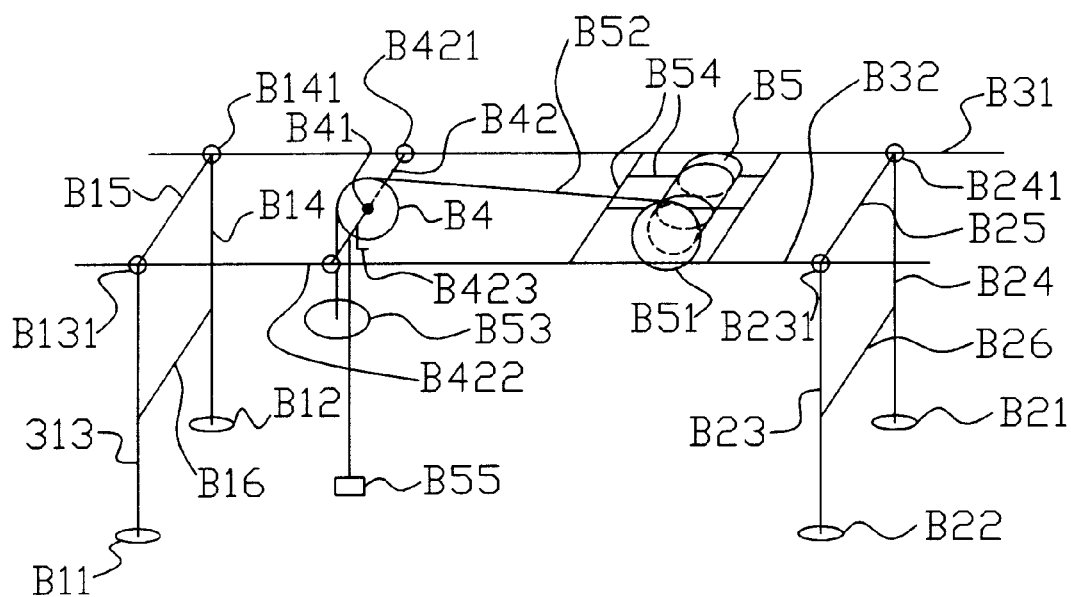
FIG. 8 is a schematic perspective view of a handset lifting device according to the present invention.

Referring to FIG. 7 showing the single clamping assembly force transmitting device, a main clamp frame is referenced by A711, while securing clamps are referenced by A712, A713, for holding the force transmitting device. The movable securing clamp is referenced by A714, which is adapted to clamp the vertical frame A7. The rest of the clamping elements are also arranged based on the same principle. In general, the handset has to be picked up before a number can be dialed. If a telephone set is already with a "TALK" pushbutton, a clamping element and a force transmitting device may be added and located above the additional pushbutton. If the telephone set is not equipped with a "TALK" pushbutton and it is necessary to use a handset, the present invention provides a handset pick-up device (as shown in FIG. 8). According to the present invention, bases B11, B12, B21, B22 support vertical frames B13, B14, B23, B24 and longitudinal frames B15, B16, B25, B26. Four clamps B131, B141, B231, B241 are secured at the intersections of the vertical and longitudinal frames to respectively clamp the horizontal frames B31, B32 as shown in FIG. 8. Between the two horizontal frames are mounted bearing frames B41, B42 having movable clamps B421, B422 and upper limit switch B423 attached thereto, and motor support B54. The positions of the longitudinal supports of the handset pick-up device are all adjustable to match the position of the handset. A motor B5 is installed at the motor support B54. When the motor is controlled to rotate in a clockwise direction, it will bring a rotary disk B51 to likewise rotate in a clockwise direction to retrieve a pull wire B52 to lift a handset jacket B53 via a wheel B4, and the motor stops rotation when the handset touches the upper limit switch of the bearing frame. Then the telephone will execute the automatic dialing function (the telephone number being designated in the motor controller) After dialing is completed, the motor controller 8 will emit a signal to cause the motor B5 to rotate in a counter-clockwise direction to drop the pull wire until the handset is put back into position and touches the lower limit switch B55. All the operations of the device of the present invention hence stop.

In summary, the positions of all the supports, clamps and clamping elements on the clamp frames of the force transmitting devices are adjustable to match the size and positions of the pushbuttons of the telephone sets in actual use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A mechanical automatic pushbutton dialing device for telephones, in which a roller rolls along a planar plate having a plurality of holes and selectively enters one of said holes by means of a motor, springs, and a roller guiding mechanism, the instant falling of said roller upon entering said selected hole generating a downward action which is utilized to achieve automatic pushbutton dialing, wherein said roller guiding mechanism essentially includes bases driven by power elements to drive a roller guiding frame which has a roller bearing set provided thereon, the two ends of said bearings are respectively provided with springs such that when the bottom side of said roller is inserted into said planar plate, said roller may be subjected to a downwardly pulling force and said roller may also perform rolling movement when said mechanism is moved; and a selective hole entering mechanism includes power elements to drive two pulleys mounting a belt having a single rectangular hole, said rectangular hole having a width matching the thickness of said roller of said roller guiding mechanism and a length permitting said roller of said roller guiding mechanism to fall into a suitable depth but not entirely passing through, said planar plate being disposed above said belt so that said roller may roll along said planar plate in a linear direction, a suitable number of rectangular holes suitable spaced apart from each other being provided on said planar plate in the path of said roller, said spaced rectangular holes of said planar plate being sized to match said rectangular hole of said belt, a bottom plate being installed below said belt and having the same number and size of rectangular holes as those of said planar plate in corresponding positions, such that when said rectangular hole of said belt forms a straight line with one of said rectangular holes of said planar plate and one of said rectangular holes of said bottom plate, said roller will roll to said one hole of said planar plate and fall through said rectangularhole of said belt into said rectangular hole of said bottom plate.

* * * * *